United States Patent
Vigild et al.

(10) Patent No.: US 7,261,098 B2
(45) Date of Patent: Aug. 28, 2007

(54) SYSTEM AND METHOD FOR ADJUSTING THE EXHAUST GAS RECIRCULATION RATE IN AN INTERNAL COMBUSTION ENGINE

(75) Inventors: Christian Winge Vigild, Aldenhoven (DE); Charles Francois Tumelaire, Aachen (DE); Daniel Roettger, Eynatten (DE); Evangelos Karvounis, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/387,634

(22) Filed: Mar. 23, 2006

(65) Prior Publication Data

US 2006/0213490 A1 Sep. 28, 2006

(30) Foreign Application Priority Data

Mar. 26, 2005 (DE) .................... 10 2005 013 977

(51) Int. Cl.
*F02M 25/07* (2006.01)
*F02D 41/14* (2006.01)
*F02B 47/08* (2006.01)

(52) U.S. Cl. ................. 123/704; 60/602; 60/605.2; 123/568.21

(58) Field of Classification Search .......... 123/568.21, 123/698, 704; 60/605.2, 602
See application file for complete search history.

(56) References Cited

U.S. PATENT DOCUMENTS

| | | | | | |
|---|---|---|---|---|---|
| 4,168,683 | A | * | 9/1979 | Hata et al. ............ | 123/704 |
| 4,727,849 | A | * | 3/1988 | Nishida et al. ....... | 123/704 |
| 5,201,303 | A | * | 4/1993 | Kojima ................. | 123/704 |
| 5,473,888 | A | * | 12/1995 | Douta et al. ........... | 123/694 |
| 5,927,075 | A | | 7/1999 | Khair | |
| 6,000,385 | A | * | 12/1999 | Fukuma ................. | 123/704 |
| 6,820,599 | B2 | * | 11/2004 | Kurtz et al. ........ | 123/568.21 |
| 6,899,090 | B2 | * | 5/2005 | Arnold ................. | 60/605.2 |

FOREIGN PATENT DOCUMENTS

DE 10130471 3/2002

* cited by examiner

*Primary Examiner*—T. M. Argenbright
(74) *Attorney, Agent, or Firm*—Julia Voutyras; Allan J. Lippa

(57) ABSTRACT

An exhaust gas recirculation system for an internal combustion engine, which comprises an intake plenum, an exhaust gas system, and a fresh-air feed line and an exhaust gas recirculation line connected to the intake plenum, includes a sensor, arranged in the intake plenum for measuring an amount of an exhaust gas component, and a controller constructed for outputting a correcting variable based on the sensor and adjusting the percentage by mass of inert gas in the intake plenum on the basis of the correcting variable. The sensor arranged in the intake plenum is a gas concentration sensor which is equipped for determining the air ratio, the oxygen concentration or the carbon dioxide concentration in the intake plenum and to output as sensor variable a variable representing the air ratio, the oxygen concentration or the carbon dioxide concentration to controller.

13 Claims, 3 Drawing Sheets

SYSTEM AND METHOD FOR ADJUSTING THE EXHAUST GAS RECIRCULATION RATE IN AN INTERNAL COMBUSTION ENGINE

FIELD OF THE INVENTION

The present invention relates to an exhaust gas recirculation system for a motor vehicle, and more particularly to a system and a method for adjusting the exhaust gas recirculation rate in an exhaust gas recirculation system.

BACKGROUND AND SUMMARY OF THE INVENTION

In an exhaust gas recirculation system for an internal combustion engine, a part of the exhaust gas mass flow flowing through the exhaust gas manifold is recirculated into the intake plenum of the engine. The recirculated exhaust gas is mixed with fresh air in or before the intake plenum. The exhaust gas recirculation rate, i.e. the proportion of the exhaust gas mass flow in the total flow of the exhaust gas/fresh air mixture supplied to the intake plenum, may be adjusted via one or more valves and possibly also via the turbine geometry of a turbocharger having a variable turbine geometry. In vehicles with turbochargers, the exhaust gas is frequently taken off from the exhaust system upstream of the turbine section of the turbo charger.

One goal to be achieved through the use of exhaust gas recirculation systems is the reduction of the pollutant discharge from engines. This requires suitable control systems for the exhaust gas recirculation system. An exhaust gas recirculation system in which the exhaust gas recirculation rate is adjusted on the basis of the operating state of the internal combustion engine is described in U.S. Pat. No. 5,927,075.

To further improve the behavior of internal combustion engines with exhaust gas recirculation in regard to their pollutant discharge, an exhaust gas recirculation system in which a pressure-dependent regulation of the exhaust gas recirculation rate takes place is described in DE 101 30 471 A1.

The inventors herein have recognized that, although it has already been possible to achieve advances in reducing the pollutant emissions through the use of exhaust gas recirculation systems of the prior art, further improvements are required. For example, in the exhaust gas recirculation systems of the prior art, a strongly pulsating flow of the exhaust gas recirculation can occur, for example. The strong pulsating leads to a poorer quality of the mixing of exhaust gas and fresh air and thus to a non-optimal behavior with regard to the pollutant discharge. In addition, it is difficult to measure the mass flow of the recirculated exhaust gas in exhaust gas recirculation systems of the prior art.

Further, a strong interaction between the dynamics of exhaust gas recirculation and the dynamics of the charging pressure in the exhaust gas turbocharger leads to problems in the application of conventional decentralized control algorithms for controlling the exhaust gas mass flow or the charging pressure, respectively.

Finally, the temperature in the intake plenum depends on the charging pressure and the exhaust gas mass flow and can thus not be adjusted independently of these two parameters.

Accordingly, the present invention is directed to a method and a system to provide a motor vehicle with an improved exhaust gas recirculation system, and more particularly to an improved method for adjusting the exhaust gas recirculation rate in an exhaust gas recirculation system.

According to this invention, an exhaust gas recirculation system for an internal combustion engine having an intake plenum, an exhaust gas system, and a fresh-air feed line connected to the intake plenum includes: an exhaust gas recirculation line connected to the intake plenum, at least one sensor, arranged in the intake plenum, said sensor providing a signal indicative of an amount of an exhaust gas component, a controller reading said sensor signal, said controller calculating a correcting variable based on said sensor signal, and adjusting a mixing ratio of exhaust gas to fresh air in the intake plenum based on said calculated correcting variable.

According to one aspect of the invention, the sensor is a gas concentration sensor. In one embodiment of the present invention, the sensor determines the oxygen concentration in the intake plenum and to outputs a variable representing the oxygen concentration to the controller. In an alternative embodiment, the sensor may be a carbon monoxide sensor.

The exhaust gas recirculation system according to the invention enables the oxygen concentration or carbon dioxide concentration in the intake plenum to be estimated, which makes it possible to control the percentage by mass of the inert gas in the intake plenum.

Instead of on the basis of the oxygen or carbon dioxide concentration measured in the intake plenum alone, the correcting variable can also be produced on the basis of the oxygen or carbon dioxide concentration measured/estimated in the intake plenum together with an oxygen or carbon dioxide concentration measured in the exhaust gas system. In this case, the exhaust gas recirculation system is also equipped with a gas concentration sensor for detecting the oxygen concentration or carbon dioxide concentration, which is arranged in the exhaust gas system, for example in the exhaust manifold.

A turbocharger with variable turbine geometry and/or an exhaust gas return valve in the exhaust gas recirculation line and/or a choke valve in the fresh air feed line can be used for adjusting the mixing ratio of exhaust gas to fresh air. Correspondingly, the exhaust gas recirculation system according to the invention is equipped with an exhaust gas return valve in the exhaust gas recirculation line and an actuator for influencing the valve position of the exhaust gas return valve in one embodiment of the invention. Alternatively or additionally, the exhaust gas recirculation system according to the invention can be equipped with a turbocharger with variable turbine geometry and an actuator for influencing the turbine geometry. As a further alternative or also additionally, the exhaust gas recirculation system according to the invention can have a choke valve in the fresh-air feed line and an actuator for influencing the valve position of the choke valve.

The invention is suitable for use in exhaust gas recirculation systems with high-pressure exhaust gas recirculation lines and systems with low-pressure exhaust gas recirculation lines. Naturally, the invention can also be used in exhaust gas recirculation systems which are equipped both with a high-pressure exhaust gas recirculation line and with a low-pressure exhaust gas recirculation line.

In yet another embodiment of the present invention, a method for controlling the mixing ratio of exhaust gas to fresh air in an exhaust gas recirculation system of an internal combustion engine, includes: measuring an amount of an exhaust gas component in an engine intake plenum, calculating a correcting variable based on said measured exhaust gas component amount, and adjusting a mixing ratio of exhaust gas to fresh air in said intake plenum based on said received correcting variable. The sensor may be an oxygen sensor or a carbon monoxide sensor.

The method according to the invention makes it possible to keep the mixing ratio in the intake plenum in a stable, steady-state condition.

The control method can be improved further, in particular with respect to transitions between various operating states of the engine, if the open cross-sectional area of the exhaust gas return valve, which is available to the exhaust gas mass flow to be recirculated, is known with sufficient accuracy. For this purpose, the method can comprise a measurement of this effective cross-sectional area which is available.

The above advantages and other advantages, and features of the present invention will be readily apparent from the following detailed description of the preferred embodiments when taken in connection with the accompanying drawings, and from the claims.

BRIEF DESCRIPTION OF THE DRAWINGS

Further features, characteristics and advantages of the present invention can be obtained from the subsequent description of exemplary embodiments, referring to the attached figures, in which.

DESCRIPTION OF PREFERRED EMBODIMENT(S)

Figure 1:
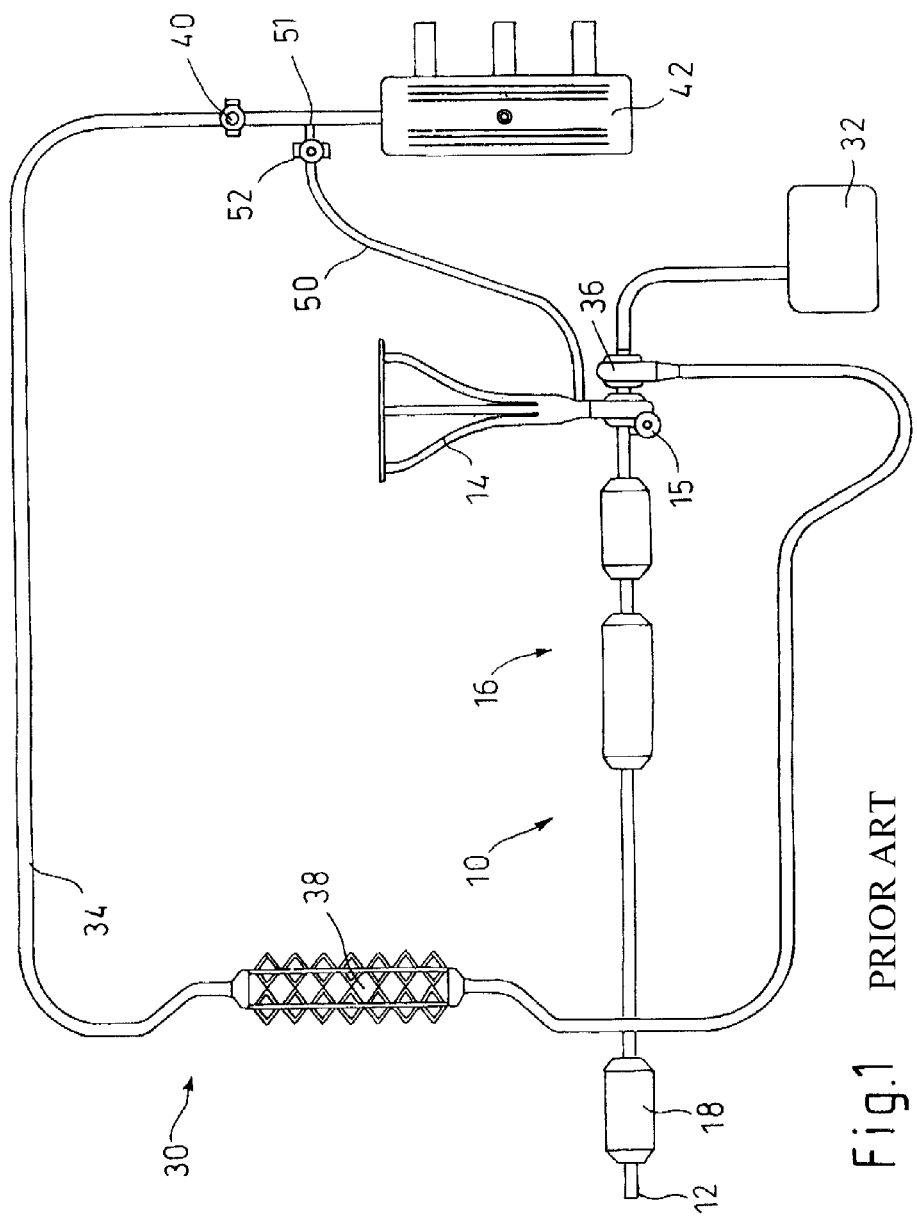
FIG. 1 shows an exhaust gas recirculation system of the prior art.

To facilitate the understanding of the present invention, an exhaust gas recirculation system (EGRsystem) of the prior art will first be described with reference to FIG. 1. FIG. 1 is only a diagrammatic representation in which the real dimensions or the real geometry of the system have not been considered.

The EGR system of the prior art comprises an exhaust gas system 10 and a fresh-air supply 30. The exhaust gas system 10 is used for removing the exhaust gases produced in the internal combustion engine (not shown) via an exhaust 12 into the open. In the exhaust gas system, the exhaust gas manifold 14, the turbine section 15 of an exhaust gas turbocharger, system 16 and a muffler 18 are arranged, starting from the engine in the direction of flow towards the exhaust. The EGR system shown in FIG. 1 is used in a vehicle with a diesel engine as internal combustion engine. Correspondingly, the exhaust treatment system 16 comprises a catalytic converter and a soot filter. EGR systems, including the EGR system according to the invention still to be described, can also be used in connection with other engines apart from in connection with diesel engines, however. For example, spark ignition engines, gas engines or hybrid engines are also conceivable. In this case, the exhaust treatment system does not comprise a soot filter.

The fresh air supply 30 comprises an intake device which is indicated in FIG. 1 by an air filter 32. Starting from the air filter 32, the fresh air flows to the internal combustion engine (not shown). In the direction of flow, a compressor 36, an optional charging air cooler 38 and a choke valve 40 are arranged in the fresh-air feed line 34 of the fresh air supply 30. The fresh-air feed line 34 opens into an intake plenum 42 from which the fresh air is supplied to the internal combustion engine. The compressor 36 arranged in the fresh-air feed line 34 is part of the exhaust gas turbocharger and is driven by the turbine section 15. It is used for compressing the intake air to a higher pressure. The compressed fresh air is then cooled using the charging air cooler 38 which advantageously influences the thermal loading of the engine, the exhaust gas temperature and thus the $NO_x$ emission and fuel consumption. In the case of spark ignition engines, the charging-air cooling also increases the knock resistance of the engine. The fresh-air mass flow finally supplied to the intake plenum 42 can be adjusted via the choke valve 40.

In the exhaust gas recirculation system shown in FIG. 1, the exhaust gas system 10 is connected to the fresh-air supply 30 via an exhaust gas recirculation line 50 (EGR line). A part of the exhaust gas mass flow is branched off from the exhaust gas system 10 upstream of the turbine 15 and supplied to the fresh-air mass flow in the fresh-air supply 30 in the area between the choke valve 40 and the intake plenum 42. The exhaust gas mass flow supplied to the fresh-air mass flow can be adjusted via an EGR valve 52 arranged in the immediate vicinity of the joining point 51 of the EGR line 50 into the fresh-air supply 30. The EGR line 50 shown in FIG. 1 is a so-called high-pressure EGR line since the recirculated exhaust gas mass flow is branched off upstream of the turbine section 15. In other words, the recirculated exhaust gas mass flow is branched off before the exhaust gas mass flow, which is under high pressure, expands under work intensity in the turbine 15.

In the operation of the EGR system, the part of the exhaust gas mass flow supplied to the fresh-air supply 30 is mixed with the fresh-air mass flow and supplied to the engine. The mixing ratio between exhaust gas and fresh air is controlled by suitable adjustment of the exhaust gas return valve 52, the choke valve 40 and the turbine geometry in turbochargers with variable turbine geometry. The mixing itself takes place in the section of the fresh-air feed line 34 located between the choke valve 40 and the intake plenum 42. In the prior art, the correcting variables for the exhaust gas return valve, the choke valve and geometry of the turbines are determined, for example on the basis of the operating state of the engine as is described in U.S. Pat. No. 5,927,075. In DE 101 30 471A1 in contrast, the exhaust gas recirculation system is controlled on the basis of pressures in the exhaust gas recirculation system.

Figure 2:
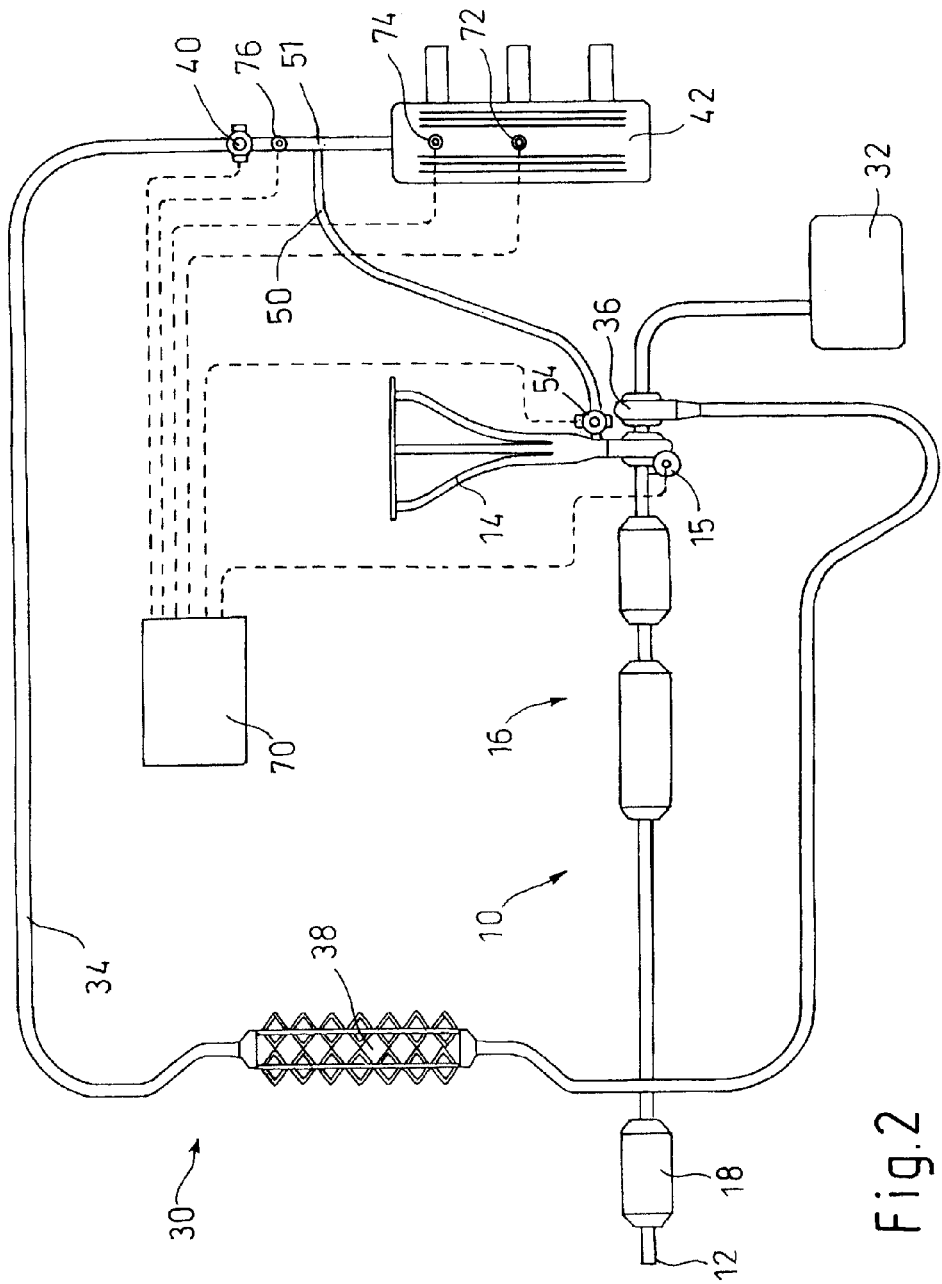
FIG. 2 shows a first exemplary embodiment of an exhaust gas recirculation system according to the invention.

An exhaust gas recirculation system according to the present invention is shown in FIG. 2. Elements corresponding to the exhaust gas recirculation system described with reference to FIG. 1 are designated by the same reference numbers as in FIG. 1.

The exhaust gas recirculation system according to the invention essentially differs from the exhaust gas recirculation system shown in FIG. 1 in that it exhibits a controller 70 and a number of sensors 72, 74, 76 connected to the controller 70. The controller 70 is connected to the turbine 15, the choke valve 40 and an exhaust gas return valve 54 for outputting correcting signals. The exhaust gas return valve 54 of the exhaust gas recirculation system according to the invention differs from the exhaust gas recirculation system 52 of the exhaust gas recirculation system of the prior art in that it is arranged not in the immediate vicinity of the joining point 51 of the EGR line 50 into the fresh-air feed line 34 but in the immediate vicinity of the exhaust manifold 14. In this arrangement, the gas composition in the area of the EGR valve 56 immediately after opening of the valve corresponds to the gas composition in the exhaust manifold 14. This applies as long as the distance between the EGR valve and the exhaust can be neglected.

The sensor 72 measures the temperature in the intake plenum, the sensor 74 measures the oxygen concentration ($O_2$ concentration) or the carbon dioxide concentration ($CO_2$ concentration) in the intake plenum and the sensor 76 measures the pressure in the fresh-air feed line 34 between the choke valve 40 and the junction 51 of the EGR line 50.

The controller 70 is designed for controlling the percentage by mass of the inert gas in the intake plenum. The control is effected by means of outputting the correcting variables to the EGR valve 54, the choke valve 40 and the turbine blades in the turbine section 15 of the exhaust gas turbocharger. At this point, it should be noted, however, that each individual one of the said elements can be used for controlling the percentage by mass of inert gas. In particular, control by means of the EGR valve alone is possible, in principle.

The control signals for the EGR valve 54, the choke valve 40 and the geometry of the turbine blades 15 are calculated by the controller 70 on the basis of the calculation structure, described later, of the proportion of inert gas, F, and the available sensor signals. If a gas sensor signal is available in the suction pipe, closed-loop control of the suction-pipe oxygen concentration is guaranteed. This signal can produce either the oxygen concentration or the carbon dioxide concentration in the intake plenum. The oxygen concentration and the carbon dioxide concentration are connected directly with the percentage by mass of inert gas in the intake plenum 42. Thus, for example in the case of recirculation of exhaust gas, the percentage by mass of inert gas in the exhaust gas/fresh-air mixture increases by a proportion which is directly associated with the oxygen component or the carbon dioxide component, respectively, in the recirculated exhaust gas.

The proportion F of the proportion of the oxygen originally contained in the fresh air, converted into carbon dioxide during the combustion, in a given volume, i.e. the gas composition in this volume, is approximately given by the formula $$F = \frac{m_b}{m} \approx \left(1 - \frac{O_2\%}{21\%}\right)$$

where $m_b$ is the percentage by mass of the oxygen originally contained in the fresh air, converted into carbon dioxide during the combustion, m is the total mass of the gas located in the volume considered and $O_2\%$ is the percentage of oxygen in this volume. In the exhaust gas, this percentage of oxygen is less than the 21% percentage of oxygen in the fresh air since a part of the oxygen has already been consumed in the combustion process. Apart from being expressed by the oxygen concentration in the volume, the proportion F can also be expressed by the difference of the carbon dioxide concentration $CO_2\%$ in the volume and the carbon dioxide concentration $CO_2\%_{Air}$ of the fresh air according to the formula $$F = CO_2\% - CO_2\%_{Air}.$$

The proportion $F_{MAN}$ of the combusted mass in the inlet plenum referred to the proportion of combusted mass in the exhaust manifold $F_{EXH}$ essentially reproduces the exhaust gas recirculation rate $EGR_{Rate}$ and corresponds to the air ratio $\lambda_{EXH}$ in the exhaust manifold referred to the air ratio $\lambda_{MAN}$ in the intake plenum. The air ratio $\lambda$ reproduces the ratio of supplied air mass to the air demand with stoichiometric combustion. The following formula for steady-state conditions applies:

$$\begin{aligned}AGR_{Rate} &= \frac{CO_2\%_{MAN} - CO_2\%_{AIR}}{CO_2\%_{EXH} - CO_2\%_{AIR}} \\ &\approx \frac{\lambda_{EXH}}{\lambda_{MAN}} \\ &\approx \frac{F_{MAN}}{F_{EXH}} \\ &= \frac{\left(1 - \frac{O_2\%_{MAN}}{21\%}\right)}{\left(1 - \frac{O_2\%_{EXH}}{21\%}\right)}.\end{aligned}$$

The exhaust gas recirculation rate $EGR_{Rate}$ is suitable for adjusting the desired percentage by mass of inert gas which is essentially given by the nitrogen and carbon dioxide percentage of the gas mixture in the intake plenum. The percentage by mass of inert gas in the intake plenum can be regulated, therefore to a desired nominal value by outputting the correcting variables to the EGR valve 54 and/or the throttle valve 40 and/or the turbine 15.

In the text which follows, the adjustment of the inert gas ratio in the intake plenum by means of the EGR valve 54 will still be discussed. The exhaust gas recirculation line 50 between the EGR valve and the junction point 51 into the fresh-air feed line 34 generally presents a negligible flow resistance. The consequence is that the mass flow at the junction point 51 largely corresponds to the mass flow at the EGR valve 54. The mass flow at the EGR valve can therefore be determined by means of the information about the gas composition in the intake plenum 42. As an alternative, it is also possible to utilize both information about the gas composition $F_{MAN}$ in the intake plenum and about the gas composition $F_{EXH}$ in the exhaust gas system for determining the mass flow through the EGR valve 54. In addition, it is advantageous if the valve position of the EGR valve 54 is also measured in order to obtain a suitable characteristic value for the effective area which is available for the flow through the EGR valve 54. This makes it possible to improve the performance of the EGR control system during the transition between various operating states of the internal combustion engine. At this point it should be pointed out, however, that although the measuring of the valve position is helpful, it is not necessary since the feedback information supplied by the gas composition sensor 74 is already sufficient for ensuring control. In particular, the gas composition sensor 72 is sufficient for ensuring stable control in a steady-state condition of the inert gas in the intake plenum.

The gas composition $F_{EGR}$, valve (proportion of combusted mass) at the EGR valve 54 assumes the gas composition of the exhaust gas $F_{EXH}$ without significant time delay for as long as the distance between the EGR valve 54 and the exhaust can be neglected. However, the gas composition $F_{EGR,in}$ at the junction 51 of the exhaust gas recirculation line 50 into the fresh-air feed line 34 does not necessarily reach the gas composition $F_{EXH}$ of the exhaust gas without significant time delay since the gas must first be transported from the EGR valve 54 to the junction point 51. The proportion of combusted mass at the junction point 51 at time t therefore corresponds, as a rule, to the proportion of combusted mass in the area of the EGR valve 54 at a time t' which is earlier by a delay time of $t_d$ i.e., the following holds true: $F_{EGR,in}(t)=F_{EGR,value}$. The delay time $t_d$ can be calculated with the aid of the following formula $$t_d = \frac{m_{AGR,in}}{\dot{m}_{AGR,valve}} = \frac{V_{AGR} P_{AGR}}{RT_{AGR,mean}} \cdot \frac{1}{\dot{m}_{AGR,valve}}$$

where $V_{EGR}$ designates the volume of the exhaust gas recirculation system, i.e. of the exhaust gas recirculation lines including any exhaust gas cooler which may be present between the EGR valve and the junction 51 into the fresh-air feed line 34, $m_{EGR}$ designates the gas mass located in this volume, $P_{EGR}$, $T_{EGR}$, and R designate the pressure in the exhaust gas recirculation system, the mean value of the temperature of the exhaust gas recirculated and the gas constant, respectively.

Using the formulae represented above, the flow of the combusted gas mass $\dot{m}_{b,MAN}$, occurring into the intake plenum can be modeled by the following equation:

$$\dot{m}_{b,MAN}=F_{EGR,in}(t)\cdot \dot{m}_{EGR,in}\approx F_{EGR,valve}(t-t_d)\cdot$$
$$\dot{m}_{EGR,in}\approx F_{EGR,valve}(t-t_d)\cdot \dot{m}_{EGR,valve}$$

The rate of change of the proportion of the combusted gas mass in the intake plenum $F_{MAN}$, can be approximated by a differential equation which is based on a simple filling and emptying analogy for the gas exchange procedure in the intake plenum, for example by the following formula:

$$\frac{dF_{MAN}}{dt} = \frac{d}{dt}\left(\frac{m_{b,MAN}}{m_T}\right) = \frac{dm_{b,MAN}}{dt}\frac{1}{m_T} -$$
$$F_{MAN}\frac{dm_{b,MAN}}{dt}\frac{m_T}{m_T}$$
$$= \frac{R\cdot T_{MAN}}{P_{MAN}\cdot V_{MAN}}[(F_{AGR} - F_{MAN})\cdot \dot{m}_{AGR} - F_{MAN}\cdot \dot{m}_{AIR}]$$
$$\approx \frac{R\cdot T_{MAN}}{P_{MAN}\cdot V_{MAN}}[(F_{EXH}(t-t_d) - F_{MAN}(t))\cdot$$
$$\dot{m}_{AGR,valve}(t) - F_{MAN}(t)\cdot \dot{m}_{AIR}(t)]$$

where $m_{b,MAN}$ and $m_T$ designate the combusted gas mass m in the intake plenum and the total gas mass in the intake plenum.

The controller can advantageously also take the reaction time of the gas composition sensor into consideration, which can be a lambda sensor, an oxygen sensor or a carbon dioxide sensor. The sensor typically has a time constant $\tau_{sensor}$, which is comparable to the total time constant of the exhaust gas recirculation system. A linear differential equation of the first order is normally sufficient for modeling the output signal $F_{MAN,mess}$ of the sensor. This linear differential equation typically has the following form:

$$\frac{dF_{MAN,mess}}{dt} = \frac{1}{\tau_{sensor}}(F_{MAN} - F_{MAN,mess}).$$

Naturally, the sensor model used can also be more sophisticated and comprise a higher-order differential equation if necessary.

Figure 3:
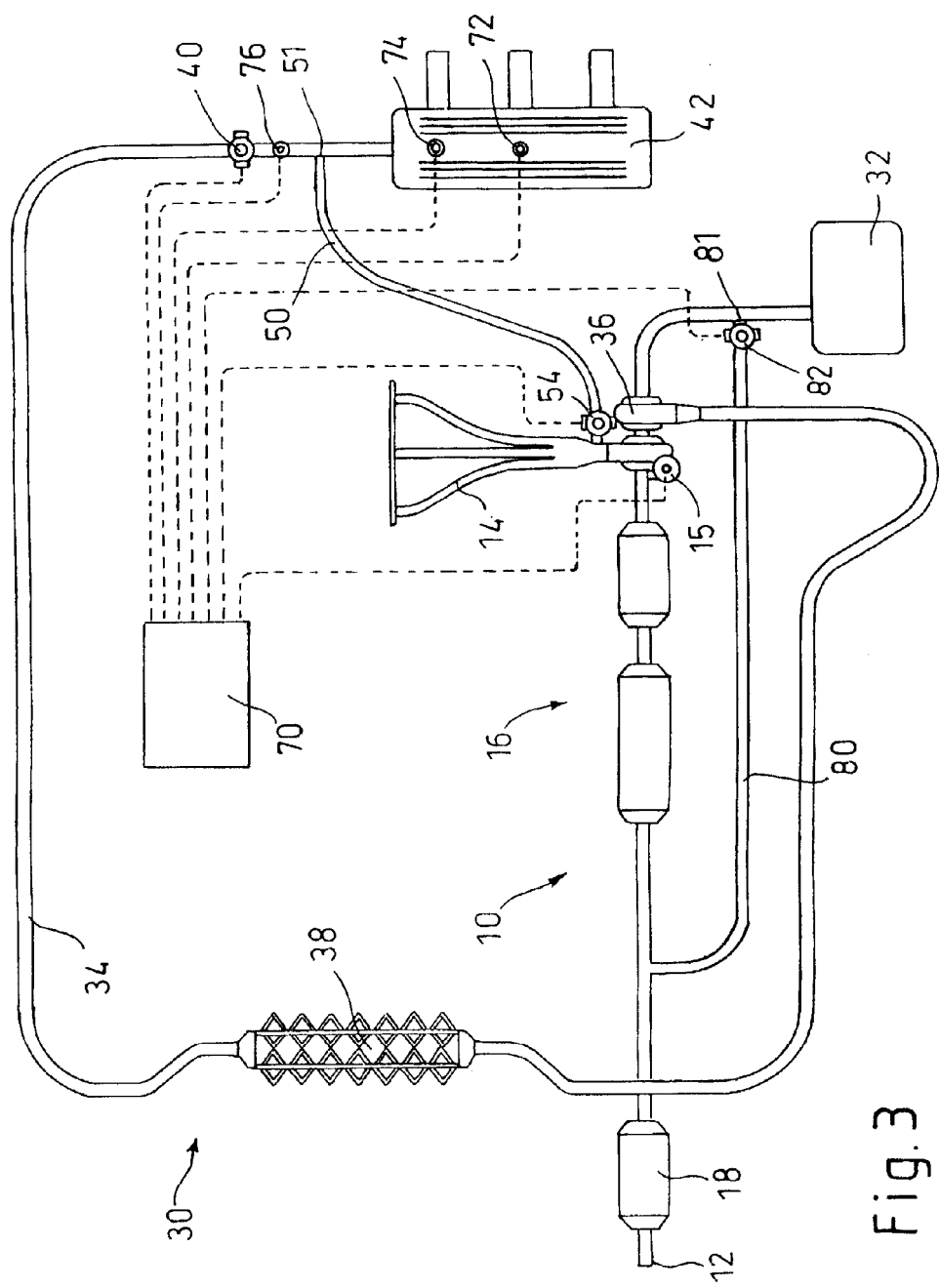
FIG. 3 shows a second exemplary embodiment of an exhaust gas recirculation system according to the invention which comprises both a high-pressure exhaust gas recirculation line and a low-pressure exhaust gas recirculation line.

A second exemplary embodiment for the exhaust gas recirculation system according to the invention is shown in FIG. 3. The exhaust gas recirculation system in FIG. 3 only differs from the exhaust gas recirculation system in FIG. 2 in that additionally to the high-pressure exhaust gas recirculation line 50, a low-pressure exhaust gas recirculation line 80 is also present. In the low-pressure exhaust gas recirculation 80, a part of the exhaust gas mass flow is branched off downstream of the exhaust treatment system 16 and supplied to the fresh-air supply 30 upstream of the compressor 36. An exhaust gas return valve 82, by means of which it is possible to adjust the amount of exhaust gas which is supplied to the fresh-air supply 30 via the low-pressure exhaust gas recirculation line 80 is arranged in the immediate vicinity of the junction point 81 of the low-pressure exhaust gas recirculation line 80 into the fresh air supply 30. Like the exhaust gas return valve 54 of the high-pressure exhaust gas recirculation line 50, the exhaust gas return valve 80 is connected to the controller 70 for receiving a correcting signal.

This concludes the description of the invention. The invention is not limited to the above embodiments, but may be varied freely within the scope of the claims:

The invention claimed is:

1. An exhaust gas recirculation system for an internal combustion engine having an intake plenum and a fresh-air feed line coupled to the intake plenum, the engine further having an exhaust gas system coupled downstream of it, the system comprising:
   an exhaust gas recirculation line coupled to the intake plenum;
   at least one gas concentration sensor arranged in the intake plenum;
   and a controller reading said sensor signal, said controller calculating a control variable based on a model of the reaction time of the sensor and said sensor signal, and adjusting a mixing ratio of exhaust gas to fresh air in the intake plenum based on said calculated control variable.

2. The exhaust gas recirculation system, as claimed in claim 1, wherein said sensor provides a signal indicative of an amount of oxygen concentration in said intake plenum.

3. The exhaust gas recirculation system, as claimed in claim 1, wherein said sensor provides a signal indicative of an amount of carbon monoxide concentration in said intake plenum.

4. The exhaust gas recirculation system, as claimed in claim 1 further comprising an exhaust gas return valve in said exhaust gas recirculation line and an actuator for influencing a position of said exhaust gas return valve.

5. The exhaust gas recirculation system, as claimed in claim 4 further comprising a sensor for determining said valve position of said exhaust gas return valve.

6. The exhaust gas recirculation system, as claimed in claim 5, further comprising a turbocharger with variable turbine geometry and an actuator for influencing the turbine geometry.

7. The exhaust gas recirculation system, as claimed in claim 6, further comprising a choke valve in the fresh-air feed line and an actuator for influencing a valve position of said choke valve.

8. The exhaust gas recirculation system, as claimed in claim 7, further comprising a high-pressure exhaust gas recirculation line.

9. The exhaust gas recirculation system, as claimed claim 8, further comprising a low-pressure exhaust gas recirculation line.

10. A method for controlling the mixing ratio of exhaust gas to fresh air in an exhaust gas recirculation system of an internal combustion engine, the engine having an exhaust gas system coupled downstream of it, the engine further having a fresh-air feed line and an exhaust gas recirculation line coupled to an engine intake plenum, the method comprising: measuring an amount of an exhaust gas component in the intake plenum with a sensor, calculating a control variable based on said measured exhaust gas component amount and a model of the reaction time of the sensor, and adjusting a mixing ratio of exhaust gas to fresh air in the intake plenum based on said received control variable.

11. The method as claimed in claim 10, wherein said correcting variable is determined based on said measured amount of said exhaust gas component in the engine intake plenum and on an amount of an exhaust gas in the exhaust gas system.

12. The exhaust gas recirculation system, as claimed claim 1 wherein the control variable is a function of a model of the intake plenum.

13. The method as claimed in claim 10 wherein the control variable is a function of a model of the intake plenum.

* * * * *